United States Patent

[11] 3,617,118

[72] Inventor Hermann Muller
     Muenchen, Germany
[21] Appl. No. 45,824
[22] Filed June 12, 1970
[45] Patented Nov. 2, 1971
[73] Assignee Agfa-Gevaert Aktiengesellschaft
     Leverkusen, Germany
[32] Priority June 21, 1969
[33] Germany
[31] G 69 24 794

[54] MOTION-PICTURE CAMERA WITH FADING MECHANISM
     18 Claims, 1 Drawing Fig.

[52] U.S. Cl. .................................................. 352/91
[51] Int. Cl. ........................................... G03b 21/36
[50] Field of Search .................................. 352/91, 217

[56] References Cited
     UNITED STATES PATENTS
     1,597,229  8/1926  Ball .............................. 352/91
     3,545,852  12/1970 Winkler ........................ 352/91

Primary Examiner—S. Clement Swisher
Attorney—Michael S. Striker

ABSTRACT: A motion-picture camera wherein exposures with fadeout and fade-in effect are produced by gradually closing and opening the diaphragm. The length of that portion of motion-picture film which is exposed with fadeout effect and thereupon with fade-in effect is determined by a first disk which can be driven by the reversible motor of the film-transporting mechanism to rotate forwardly during fadeout, thereupon rearwardly during rewinding of film which was exposed with fadeout effect, and again forwardly during fade-in. The first disk rotates a second disk during rotation in the forward direction whereby the second disk initiates the making of exposures with fadeout effect in response to first rotation of the first disk in the forward direction and the making of exposures with fade-in effect during the second rotation of the first disk in such forward direction. The second disk is automatically disengaged from the first disk or both disks are automatically disengaged from the motor upon completion of exposures with fade-in effect.

PATENTED NOV 2 1971　　　　　　　　　　3,617,118
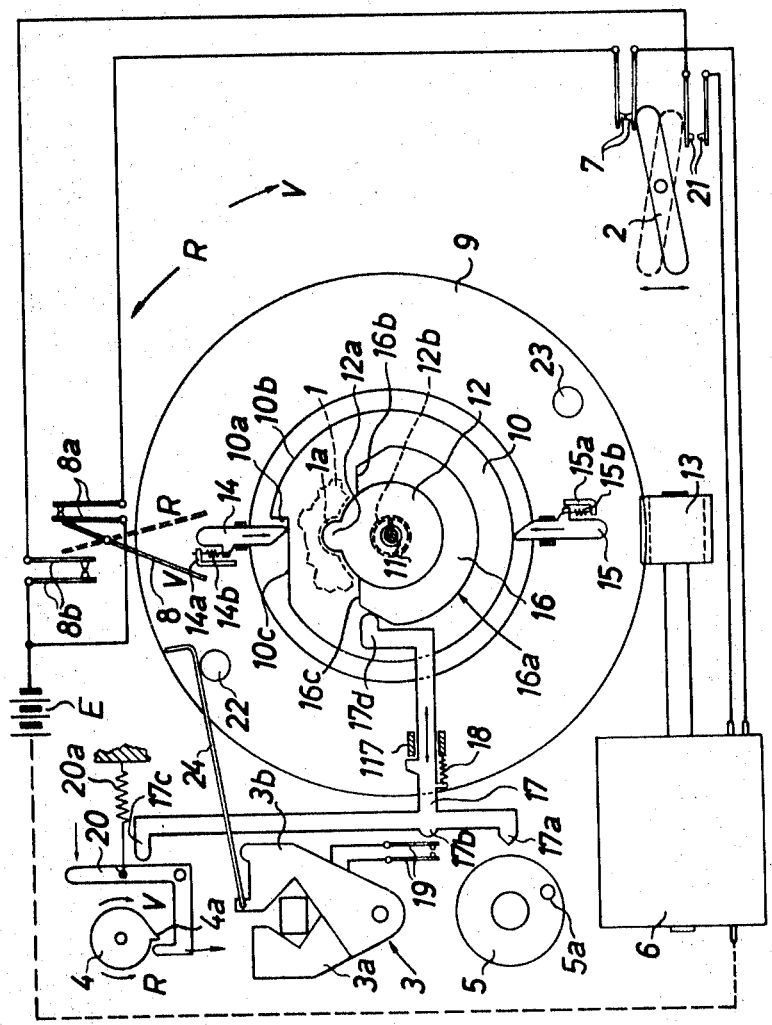
INVENTOR
HERMANN MÜLLER
BY
[signature]
Attorney

MOTION-PICTURE CAMERA WITH FADING MECHANISM

BACKGROUND OF THE INVENTION

The present invention relates to photographic apparatus in general, and more particularly to improvements in motion-picture cameras of the type having a fading mechanism which enables the operator to produce fadeout and fade-in sequences or effects. Still more particularly, the invention relates to improvements in fading mechanisms which insure that the film frames which are exposed during fadeout are exposed again during fade-in and which receive motion from an electric motor forming part of the film-transporting means.

It is known to provide a motion-picture camera with a rotary switch which controls the operation of the fading mechanism. The switch must be manipulated several times so that the making of fadeout and fade-in sequences requires repeated attention to the switch and is therefore likely to affect the quality of exposures. Moreover, presently known cameras with built-in fading mechanisms are rather bulky and expensive because the fading mechanism comprises a substantial number of precision-finished parts.

SUMMARY OF THE INVENTION

An object of the present invention is to provide a motion-picture camera with a novel and improved fading mechanism which requires less attention than presently known mechanisms and which is capable of automatically insuring that the motion-picture film which was exposed during fadeout is exposed again during fade-in of the next scene.

Another object of the invention is to provide a fading mechanism wherein a complete series of fadeout and fade-in sequences is initiated by a single manipulation of a manually operated part so that the operator need not pay further attention to such part and can concentrate on the observation of the scene or subject and on manipulation of the camera release.

A further object of the invention is to provide a compact fading mechanism which occupies little room in or on the housing of a motion-picture camera and which comprises a relatively small number of simple parts.

An additional object of the invention is to provide a motion-picture camera which embodies the improved fading mechanism and to construct and assemble the camera in such a way that satisfactory fadeout and fade-in sequences can be produced by advanced amateurs as well as by beginners.

The invention is embodied in a motion-picture camera which comprises film-transporting means preferably including a reversible electric motor operative to advance the film forwardly and rearwardly, a preferably disk-shaped driving member which is movable from a first position to a second position in response to forward transport of the film and from the second position back to the first position in response to rearward transport of the film (such driving member may receive motion from the motor of the film-transporting means by way of a worm drive or the like), a preferably disk-shaped driven member movable between operative and inoperative positions and receiving in the operative position motion from the driving member while the driving member moves from its first to its second position, a diaphragm or other suitable exposure-controlling means for producing, in the operative position of the driven member, a fadeout effect in response to a first movement of the driving member from first to second position and a fade-in effect in response to a second movement of the driving member from first to second position (i.e., the fade-in effect is produced subsequent to the movement of the driving member from its second back to its first position which movement takes place simultaneously with rearward transport of the film which was exposed during fadeout), and a spring or analogous disengaging means for returning the driven member to its inoperative position in response to completion of second movement of the driving member from its first to its second position to thus terminate the fadeout effect. The camera is thereupon ready to make exposures in the normal way while the film-transporting mechanism operates to advance the film forwardly and while the driving member may but need not receive motion from the motor of the film-transporting mechanism.

The camera is preferably provided with a knob or analogous displacing means for moving the driven member from inoperative to operative position in order to start the fadeout effect.

The novel features which are considered as characteristic of the invention are set forth in particular in the appended claims. The improved fading mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic view of a portion of a motion-picture camera which embodies the improved fading mechanism.

DESCRIPTION OF THE PREFERRED EMBODIMENTS

The drawing illustrates certain components of a motion-picture camera whose housing includes a wall 1. The camera release 2 can be pivoted by hand to move to the solid-line position in which it completes the circuit of a reversible electric motor 6 which forms part of the film-transporting means whereby the motor 6 causes the film to move forwardly. When the release 2 is moved to the broken line position, the motor 6 operates in reverse and advances the film rearwardly. The motion-picture camera further comprises an adjustable exposure-controlling diaphragm 3 whose shaft 4 (shown at a level above the vanes 3a, 3b of the diaphragm 3) is rotatable in two directions to respectively enlarge and reduce the size of the aperture. The numeral 5 denotes the driving member for the takeup reel (not shown). When moved to the solid-line position, the release 2 closes a first master switch 7 which is in circuit with the motor 6, a first control switch 8a, and an energy source E, such as a battery. In order to complete the motor circuit, the master switch 7 must be closed simultaneously with the control switch 8a which can be closed by an actuating lever 8. The latter normally assumes the illustrated solid-line position in which the contacts of the control switch 8a engage with each other. Such position of the actuating lever 8 is indicated by the character "V."

The mechanism for producing fadeout and fade-in effects comprises a driving member including a first rotary disk 9 and a driven member including a coaxial second rotary disk 10. The disks 9 and 10 are disposed in parallel planes and are together axially between operative and inoperative positions at right angles to the plane of the drawing. These disks are movable to operative positions by way of a holder or carrier including a shaft 11. The disk 10 is connected with a manually movable displacing knob 12 which can be shifted axially to place the disk 9 into mesh with a worm 13 on the output shaft of the motor 6. To this end, the peripheral portion of the disk 9 constitutes a worm wheel and this disk serves to rotate the disk 10 in response to starting of the motor 6 so as to transport the film forwardly. When the disk 9 meshes with the worm wheel 13 and the master switch 7 is closed by the release 2 (while the actuating lever 8 closes the control switch 8a), the disks 9 and 10 rotate in a clockwise direction as indicated by the arrow V.

The disk 9 supports two motion-transmitting elements in the form of slides 14, 15 which are disposed diametrically opposite each other with reference to the axis of the shaft 11 and are movable radially inwardly and outwardly. The slides 14,15 are biased radially inwardly by helical springs 14b, 15b which react against retainers in the form of brackets 14a, 15a mounted on the disk 9. The slides 14,15 serve to trip the actuating member 8, i.e., to move the actuating member 8 between the illustrated solid-line position "V" in which the control switch 8a is closed and the broken line position "R" in which the actuating member 8 closes a second control switch 8b. The inner end portions or tips of the slides 14,15 are biased against the peripheral surface of the disk 10. Such peripheral surface includes a radially extending abutment or shoulder 10a, a flat portion 10c which is adjacent to and makes an angle of 90° with the shoulder 10a, and an arcuate portion 10b whose center of curvature is located on the axis of the shaft 11. The shoulder 10a serves as an abutment for the slide 14 or 15 and the disk 10 is compelled to turn with the disk 9 when the latter turns in a clockwise direction (arrow V) and one of the slides engages the shoulder 10a. The outer disk 9 is further provided with two pin-shaped projections 22,23 which are disposed diametrically opposite each other with reference to the axis of the shaft 11 and each of which can displace a lever 24 which controls the diaphragm 3.

When the displacing knob 12 is moved axially to place the disk 9 into mesh with the worm wheel 13 and when the motor 6 thereupon begins to turn the disks 9 and 10 in the direction indicated by the arrow V, a protuberance or lobe 12a on the knob 12 moves behind the wall 1 and thus prevents disengagement of the disk 9 from the worm wheel 13. A disengaging spring 12b or the like is provided to automatically expel the lobe 12a through a notch 1a of the wall 1 so that the disk 9 is disengaged from the worm wheel 13 as soon as the disks 9 and 10 assume the illustrated angular positions.

The disk 10 carries a cam 16 which is of substantially semicircular shape and whose peripheral surface cooperates with a follower 17 reciprocable in ways 117 and biased by a spring 18 which tends to maintain its arm 17d in engagement with the cam 16. The end portions of the peripheral surface on the cam 16 are inclined, as at 16b, 16c. These end portions flank an arcuate central portion 16a of the peripheral surface. The follower 17 includes three additional arms 17a, 17b, 17c the first of which can be moved into the path of an eccentric projection 5a provided on the driving member 5 to thus hold the takeup reel against rotation in a direction to collect the film. The arm 17b can close a normally open switch 19 which automatically initiates a fadeout effect, either by electrical or by electromagnetic means in a manner not forming part of the present invention. The arm 17c of the follower 17 can pivot a blocking lever 20 which can extend into the path of a radial projection 4a on the shaft 4 of the diaphragm 3. The lever 20 is biased by a spring 20a which tends to maintain its pallet in the path of the projection 4a.

When the disk 9 meshes with the worm wheel 13 and moves from the illustrated first position to a second position by completing one-half of a full revolution in a clockwise direction (arrow V), the slide 15 engages and trips the actuating member 8 so that the latter opens the control switch 8a and simultaneously closes the control switch 8b. This opens the circuit of the motor 6 even if the release 2 continues to hold the masters switch 7 in closed position. The control switch 8b is in series with a second master switch 21 which is closed by the release 2 when the latter assumes the broken line position. The motor 6 then drives the disk 9 in reverse (arrow R) whereby the slide 14 travels back from the second position toward the illustrated first position and trips the actuating member 8 to open the switch 8b and to again close the switch 8a.

While the disk 9 rotates in a clockwise direction (arrow V) in response to closing of the switches 7 and 8a, a post 23 travels toward and engages a lever 24 to thereby lock the vanes 3a, 3b of the diaphragm 3 in closed positions. This takes place when the exposures are completed with fadeout effect are completed and before the slide 15 trips the actuating member 8 to open the switch 8a. The release 2 can be biased by a spring (not shown) which tends to maintain it in the broken line position so that the circuit of the motor 6 is completed (by way of the switches 21 and 8b) in automatic response to termination of finger pressure of the release 2 after the motor 6 is arrested in response to opening of the control switch 8a. The film frames which were exposed during fadeout are then transported rearwardly while the shutter 3 remains closed. The slides 14,15 insure that the motor 6 transports rearwardly those film frames which were exposed during fadeout. The camera is then ready for fade-in which begins as soon as the operator returns the release 2 to the solid-line position. While the motor 6 transports the film rearwardly, i.e., while the disk 9 rotates in the direction indicated by the arrow R, the tip of the slide 14 travels along the arcuate portion 10b of the peripheral surface on the disk 10 so that the latter remains at a standstill. However, when the slide 14 approaches the position shown in the drawing, it trips the actuating lever 8 to open the switch 8b and to simultaneously close the switch 8a.

As stated before, the release 2 normally dwells in the broken line position so that the master switch 7 is open. Therefore, the fade-in can begin only when the operator pivots the release 2 to the solid-line position. During rotation of the disk 9 in the direction indicated by the arrow R, a second post 22 engages the lever 24 and maintains the diaphragm 3 in closed position. The slide 15 descends along the shoulder 10a and its tip abuts against the portion 10c of the peripheral surface on the disk 10. The outer end portion of the slide 15 is then free to by pass the actuating lever 8.

During fade-in, the release 2 closes the master switch 7 and the actuating lever 8 maintains the control switch 8a in closed position. The disk 9 rotates in the clockwise direction (arrow V) and the slide 15 entrains the disk 10 because its tip engages the shoulder 10a. It is to be noted that the disk 10 shares only the clockwise angular movements of the disk 9, i.e., that it does not rotate in the direction indicated by the arrow R when the switches 8b and 21 are closed. During clockwise rotation of the disk 9, the cam 16 permits the spring 18 to shift the follower 17 to the illustrated position whereby the arm 17a moves away from the path of the eccentric projection 5a and permits rotation of the drive member 5 for the takeup reel in a direction to enable the takeup reel to collect the film. The arm 17b permits opening of the switch 19 and the arm 17c moves away from the blocking lever 20 so that the latter moves into the path of the projection 4a on the shaft 4. The lever 20 is further controlled by the release 2 and is freed by the release when the master switch 7 is closed. The post 22 moves the lever 24 to unlock the diaphragm 3 whereby the blades 3a, 3b open at a predetermined speed to gradually enlarge the size of the aperture during fade-in.

When the disk 9 completes one-half of a revolution in the clockwise direction (arrow V), during fade-in, the disk 10 completes the second half of a full revolution in a clockwise direction so that the lobe 12a of the knob 12 moves into registry with the notch 1a of the wall 1 and the displacing spring 12b moves the disks 9, 10 axially on or with the shaft 11 to disengage the disk 9 from the worm wheel 13. This terminates the fade-in. If the operator continues to hold the release 2 in the solid-line position, the exposures are made in the normal way, namely, without a fadeout or a fade-in effect. Thus, the slide 15 is out of registry with the actuating lever 8 and the latter maintains the control switch 8a in closed position.

When the user thereupon wishes to produce a second fadeout effect, the slide 15 is in the space shown occupied by the slide 14 and the slide 15 then rotates the disk 10 in response to clockwise rotation of the disk 9 following depression of the knob 12 to move the disk 9 into mesh with the worm wheel 13.

An important advantage of the improved motion-picture camera is that the fadeout effect is initiated in response to a single depression of the displacing knob 12 and that this knob need not be held in depressed position after the disk 9 begins to receive rotary motion from the motor 6. Once the fadeout effect is started in response to a short-lasting depression of the knob 12, the fadeout effect is continued, the film is rewound subsequent to completion of fadeout, and the fade-in effect is started and completed merely in response to appropriate manipulation of the release 2.

Another advantage of the illustrated structure is that the disks 9 and 10 occupy little room and that the aforementioned holder (including the shaft 11) for the disks 9,10 can be readily installed in or removed from the housing of a motion-picture camera.

During fadeout when the arm 17a of the follower 17 blocks the driving member 5 against rotation in a direction in which the takeup reel must rotate to collect the film, the film frames which are exposed during fadeout accumulate in the interior of the cassette but are not collected by the takeup reel. The forward transport of the film is effected by the customary pulldown (not shown) which is driven by the motor 6. The pulldown transports the film rearwardly while the disk 9 rotates in the direction indicated by the arrow R, and the pulldown thereupon advances the film forwardly during fade-in.

The function of the blocking lever 20 is to arrest the shaft 4 in an angular position in which the diaphragm 3 is completely closed to prevent entry of scene light. A friction clutch (not shown) is mounted in the power train between the motor 6 and the shaft 4 to insure that the shaft 4 can be arrested by the blocking lever 20 in an accurately determined angular position while the output shaft of the motor 6 continues to turn for a while after the switch 7 or 8 opens.

The lever 24 maintains the diaphragm 3 in closed position during rewinding of film upon completion of fadeout and prior to fade-in. The release 2 is connected with the blocking lever 20 by a suitable linkage (not shown) which insures that the blocking lever moves away from the path of the projection 4a on the shaft 4 when the release closes the master switch 21 during fade-in. This enables the diaphragm 3 to open gradually and to thus produce the fade-in effect.

The manner in which a shutter or a diaphragm gradually closes and opens during fadeout and fade-in is well known in the art.

It is equally within the purview of the present invention to construct and mount the disk 9 in such a way that it remains permanently connected with the motor 6 and that the disks 9 and 10 are coupled to initiate a fade-in effect in response to axial displacement of the disk 10 with reference to the disk 9, i.e., in response to axial displacement of the disk 10 from the inoperative position to an operative position in which the disk 10 shares rotary movements of the disk 9 in a clockwise direction. Such axial displacement of the disk 10 then results in placing of the shoulder 10a into the path of movement of the slide 14 or 15 on the disk 9. Also, the cam 16 on the disk 10 can be employed to effect adjustments of a dissolving shutter which then performs the function of the adjustable diaphragm 3 to produce fadeout and fade-in effects.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. In a motion-picture camera, a combination comprising film-transporting means operative to advance the film forwardly and rearwardly; a driving member movable from a first position to a second position in response to forward transport of the film and from said second to said first position in response to rearward transport of the film; a driven member movable between operative and inoperative positions and receiving in the operative position thereof motion from said driving member while the driving member moves toward said second position; exposure-controlling means for producing, in the operative position of said driven member, a fadeout effect in response to a first movement of the driving member from said first to said second position and a fade-in effect in response to a second movement of the driving member from said first to said second position so that the fade-in effect is produced subsequent to the movement of the driving member from said second to said first position; and disengaging means for returning the driven member to said inoperative position in response to completion of second movement of the driving member from said first to said second position.

2. A combination as defined in claim 1, wherein said film-transporting means comprises an electric motor and said driving member comprises a first disk which is rotatable in a first direction in response to forward transport of the film and in a second direction in response to rearward transport of the film, said driven member comprising a second disk coaxial with said first disk and movable axially between said operative and inoperative positions, said driving member further comprising motion-transmitting means provided on said first disk and cooperating with abutment means provided on said second disk to rotate the second disk in said operative position thereof while said first disk rotates in said first direction.

3. A combination as defined in claim 2, wherein said motion-transmitting means comprises two motion-transmitting elements movably mounted on said first disk and said abutment means comprises a substantially radial shoulder provided on said second disk and engaging with one of said motion-transmitting elements during said first movement of the first disk in said first direction and with the other motion-transmitting element during said second movement of the first disk in said first direction.

4. A combination as defined in claim 3, further comprising cam means provided on said second disk and arranged to operate said exposure-controlling means in response to rotation of said second disk in said first direction.

5. A combination as defined in claim 4, further comprising manually operated displacing means for moving said second disk axially from said inoperative to said operative position to thereby initiate a fadeout effect.

6. A combination as defined in claim 3, wherein said motor is reversible and further comprising actuating means movable between first and second positions to thereby respectively set said motor for operation in forward and reverse.

7. A combination as defined in claim 6, wherein said second disk is provided with an arcuate surface engaged by said motion-transmitting elements and arranged to move said actuating means to said second position by way of one of said elements in response to completion of said first movement of the first disk in said first direction and to move said actuating means to said first position by way of the other of said elements in response to completion of the movement of said first disk in said second direction.

8. A combination as defined in claim 3, further comprising substantially semicircular cam means provided on said second disk and having a peripheral surface including an arcuate central portion and two inclined end portions.

9. A combination as defined in claim 8, further comprising follower means tracking said peripheral surface and having a first portion arranged to operate said exposure-controlling means and a second portion, and rotary takeup means for collecting the film, said takeup means being arrested by the second portion of said follower means during said first movement of said first disk in said first direction.

10. A combination as defined in claim 9, wherein said exposure-controlling means includes electric switch means actuatable by the first portion of said follower means.

11. A combination as defined in claim 9, wherein said exposure-controlling means comprises a rotary member and said follower means comprises a third portion arranged to arrest said rotary member in a predetermined angular position during movement of said driving member from said second to said first position thereof.

12. A combination as defined in claim 3, wherein said first disk is provided with two projections disposed diametrically opposite each other with reference to the common axis of said disks.

13. A combination as defined in claim 12, wherein said exposure-controlling means comprises an adjustable diaphragm and further comprising mechanical locking means actuatable by said projections to lock the diaphragm during movement of said driving member from said second to said first position.

14. A combination as defined in claim 3, wherein said motor is reversible and further comprising actuating means movable by said motion-transmitting means between first and second positions, a source of electrical energy, first and second control switches respectively closed by said actuating means in the first and second positions thereof, first and second master switches, and release means operable to close one of said master switches at a time, said motor being connected with said energy source to transport the film forwardly in response to closing of said first switches and to transport the film rearwardly in response to closing of said second switches.

15. A combination as defined in claim 1, further comprising displacing means rigid with said driven member and operable by hand to move the driven member to said operative position.

16. A combination as defined in claim 1, further comprising common holder means for said driving and driven members.

17. A combination as defined in claim 1, further comprising means for retaining said driven member in operative position in response to movement of said driving member from said first position until completion of fade-in.

18. A combination as defined in claim 17, wherein said driven member comprises a rotary disk which is movable axially between said operative and inoperative positions, said means for retaining comprising a wall having a notch and a protuberance provided on said disk and passing through said notch in response to movement of said disk to operative position, said disengaging means comprising means for expelling said protuberance through said notch in response to a full revolution of said disk.

* * * * *